United States Patent [19]

Steigerwald

[11] 3,987,356
[45] Oct. 19, 1976

[54] CONTROLLED CAPACITIVE FILTER FOR ACTIVE LOADS

[75] Inventor: Robert L. Steigerwald, Scotia, N.Y.

[73] Assignee: General Electric Company, Schenectady, N.Y.

[22] Filed: June 23, 1975

[21] Appl. No.: 589,431

[52] U.S. Cl. .................................. 321/10; 307/109; 320/1; 333/79; 321/18
[51] Int. Cl.² ........................................ H02M 7/155
[58] Field of Search .................... 321/10, 18; 320/1; 307/109; 323/DIG. 1; 333/79

[56] References Cited
UNITED STATES PATENTS

| 3,854,078 | 12/1974 | Hubner .................................. 321/10 |
| 3,913,002 | 10/1975 | Steigerwald et al. .......... 323/DIG. 1 |

FOREIGN PATENTS OR APPLICATIONS

| 1,203,763 | 9/1970 | United Kingdom ................... 321/10 |

OTHER PUBLICATIONS

G.E. SCR Manual 1st Edition 1960, p. 7 Relied upon.

Primary Examiner—Gerald Goldberg
Attorney, Agent, or Firm—Donald R. Campbell; Joseph T. Cohen; Jerome C. Squillaro

[57] ABSTRACT

A single phase controlled capacitive filter with a smaller, more efficiently used filter capacitor than conventional capacitive filters is connected between rectifier terminals and supplies voltage to an active load producing dc output voltage. The charge and discharge intervals of the filter capacitor are controlled by gate controlled thyristors or other devices such that discharge occurs when the instantaneous rectified line voltage falls below the dc output voltage. The filter capacitor during discharge is placed in series with the load or can remain in parallel with the load in a simpler arrangement.

12 Claims, 10 Drawing Figures

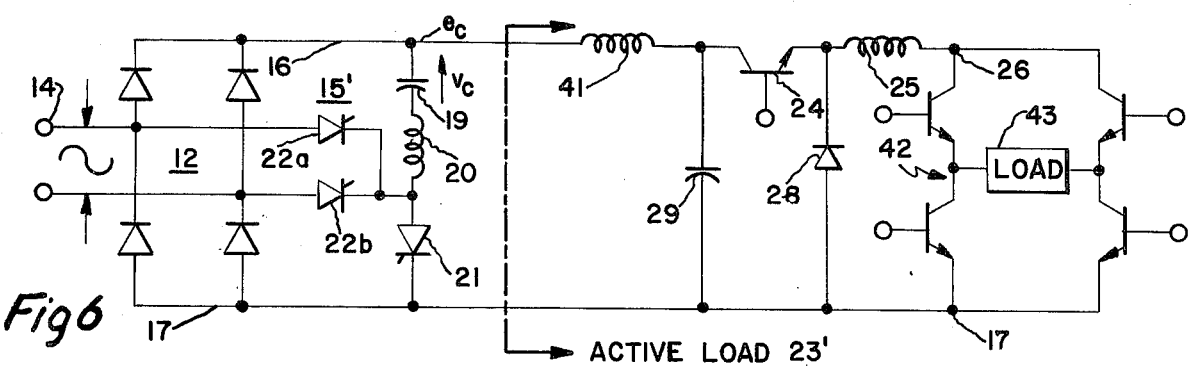
Fig.6
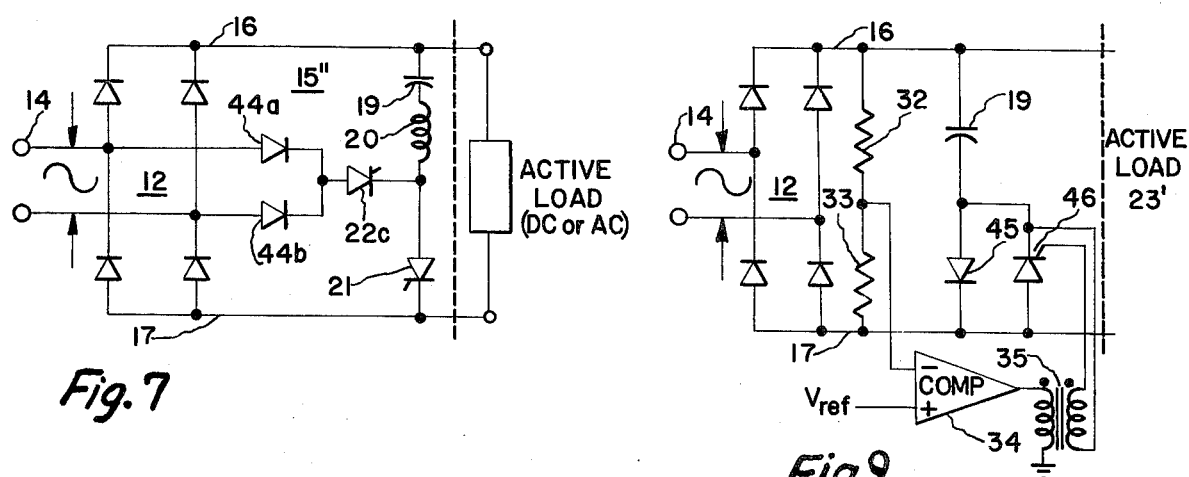
Fig.7
Fig.9
Fig.8
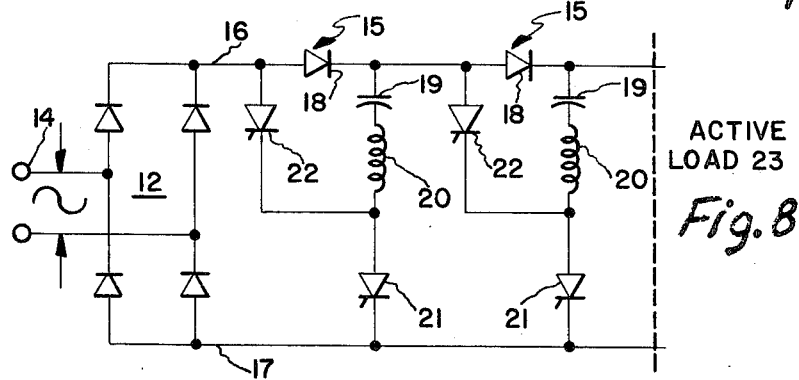
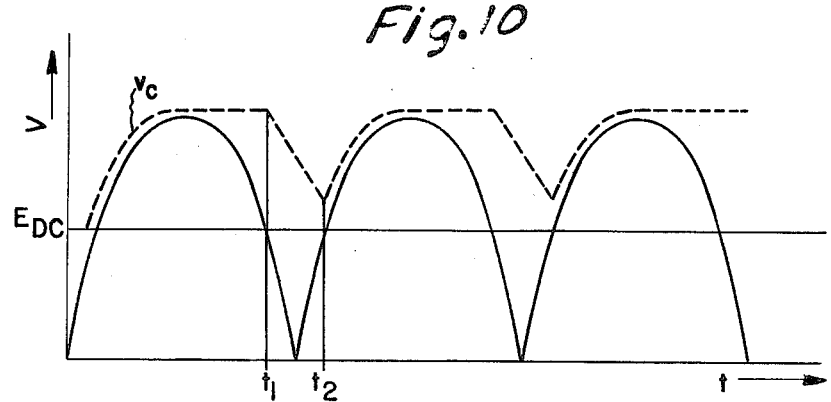
Fig.10

CONTROLLED CAPACITIVE FILTER FOR ACTIVE LOADS

BACKGROUND OF THE INVENTION

This invention relates to a controlled capacitive filter for use in power circuits with active loads, and more particularly to an efficient controlled filter circuit in which the charge and discharge intervals of the filter capacitor are controlled by solid state switches.

In conventional power circuits with a filter capacitor connected directly across the output terminals of the full wave rectifier, and wherein an active device regulates the ripple voltage appearing on the filter capacitor to produce a constant dc output voltage (see FIG. 1), the filter capacitor is used inefficiently. As will be further explained, assuming that the capacitor voltage remains above the desired dc output voltage, the capacitor stores a relatively large amount of energy that is never used and also supplies energy when it is not necessary. By employing the improved single phase capacitive filter circuit herein described, the size of the filter capacitor needed for a given application is reduced due to more efficient control. In many applications, electrolytic type capacitors can be eliminated in view of the decreased value of capacitance needed. This is especially desirable in the case of long life applications and applications over extreme temperature ranges where electrolytic capacitors have reliability problems.

SUMMARY OF THE INVENTION

In accordance with the invention, a single phase, dc controlled capacitive filter connected between the terminals of a full wave rectifier includes solid state devices such as gate controlled thyristors and diodes to control the charge and discharge intervals of a smaller, more efficiently used filter capacitor. As most commonly used with active load circuits such as a chopper producing regulated unidirectional output voltage, the discharge intervals are controlled such that the filter capacitor discharges during the valleys of the rectified line voltage when the instantaneous voltage is below the predetermined unidirectional output voltage and energy is needed by the load.

In one group of embodiments, the controlled switch or switches controlling discharge of the filter capacitor effectively places the capacitor in series with selected rectifier terminals and the load so as to completely discharge the capacitor while drawing energy from the line. The preferred arrangement uses a gate controlled thyristor (SCR) connected to the positive rectifier output terminal, while in modifications additional devices are used connected to the rectifier input terminals to conduct depending on the line polarity. To control the charging intervals, a gate controlled thyristor is provided in series with the filter capacitor in a circuit between the rectifier output terminals and is rendered conductive at a preselected delay after the capacitor has completely discharged. Thus, the peak capacitor energy is stored and the line supplies energy instead of discharging the capacitor when not needed. By using a suitable inductor in series with the capacitor and delaying gating until near the peak rectified line voltage, the capacitor is resonantly charged to a higher voltage. A tandem arrangement of the controlled filter is also described. In a simpler controlled filter configuration requiring a larger capacitor which remains in parallel with the load and rectifier output terminals during discharge, the controlled filter is comprised by a diode for controlling charging and an inverse-parallel gate controlled thyristor for controlling discharge, both in series with the filter capacitor between the rectifier output terminals. Suitable sensing and gating circuits are employed with the various embodiments.

Although having general utility, the controlled filter is advantageous in electronic ballasts for gaseous discharge lamps with reduced current requirements during the valleys of the rectified line voltage.

BRIEF DESCRIPTION OF THE DRAWINGS

FIGS. 6 and 7 show modifications of the rectifier and controlled capacitive filter of FIG. 3 used in circuits with active ac loads or active dc or ac loads;

FIG. 8 shows a tandem arrangement of the controlled capacitive filter of FIG. 3;

FIG. 9 illustrates another embodiment of the rectifier and controlled capacitive filter using only one diode and SCR; and FIG. 10 is a waveform diagram for explaining operation of FIG. 9.

DESCRIPTION OF THE PREFERRED EMBODIMENTS

Figure 1:
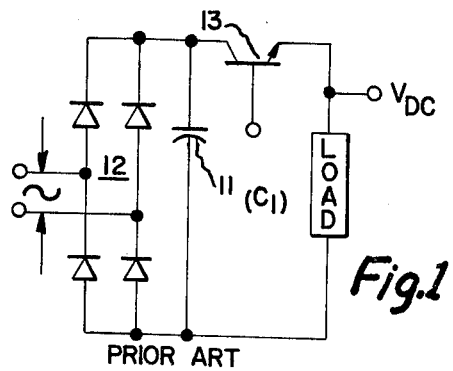
FIG. 1 is a schematic diagram of a typical prior art circuit with a rectifier and conventional capacitive filter supplying voltage to an active load.
Figure 2:
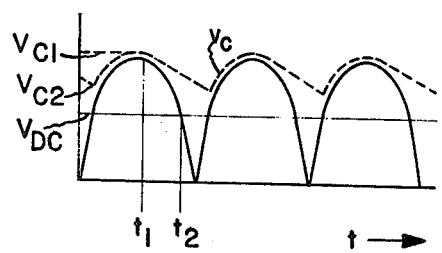
FIG. 2 shows waveforms useful in explaining inefficient use of the filter capacitor in FIG. 1.

In FIG. 1 illustrating the common prior art capacitive filter arrangement, the filter capacitor 11 is connected directly across the output terminals of a diode bridge rectifier 12 energized by single phase, 60 Hz a-c voltage. The active or controlled load circuit includes at least one active device 13 such as a series pass transistor or switching regulator transistor for regulating out the ripple voltage appearing on the filter capacitor and producing a constant d-c output voltage, $V_{DC}$, to be supplied to the load, it being assumed that the capacitor voltage $v_c$ remains above $V_{DC}$. In FIG. 2 the ideal full wave rectified sinusoidal voltage is shown in full lines and the filter capacitor voltage $v_c$ in dashed lines, and it is observed that the maximum and minimum values of the ripple voltage, $V_{C1}$ and $V_{C2}$, are above the desired output voltage $V_{DC}$. The discharge interval of the filter capacitor begins at time $t_1$ near the peak of the rectified a-c voltage and ends when the rising rectified a-c voltage in the next half cycle exceeds the approximately linearly decreasing capacitor voltage. By observing the waveforms in FIG. 2 it is seen that the filter capacitor is used in an inefficient manner for the following reasons. First, the capacitor is supplying energy to the load beginning at $t_1$ when it really is not necessary since the rectified a-c line voltage is higher than the desired d-c output voltage and the line voltage would be capable of supplying energy directly. No power is delivered to the load from the line during the capacitor discharge. The line or source must therefore supply a relatively large amount of energy in a relatively small conduction angle which results in unnecessary high line current surges. Energy is really not needed from the capacitor until approximately $t_2$ when the ideal rectified line voltage falls below the desired output voltage $V_{DC}$. Second, a substantial amount of energy is stored in the capacitor which is never used. This condition is due to the fact that the capacitor discharges only to $V_{C2}$, which is approximately equal to or slightly above $V_{DC}$. Using standard equations, it can be shown that the peak capacitor energy is $\frac{1}{2}C_1V_{C1}^2$ and that a substantial amount of energy equal to $\frac{1}{2}C_1V_{C2}^2$ is never delivered to the load. From these two statements, it is concluded that not only does the capacitor store a relatively large amount of energy which is never used, but the capacitor is also supplying energy when it is not needed. The same general conclusions are applicable for the commonly used L-C filter, except that here the capacitor delivers considerably less energy to the load since it does not charge to the peak of the rectified a-c line voltage. The series filter inductor delivers energy so that the requirements of the shunt filter capacitor are reduced, but still the filter capacitor is used in an inefficient manner.

Figure 3:
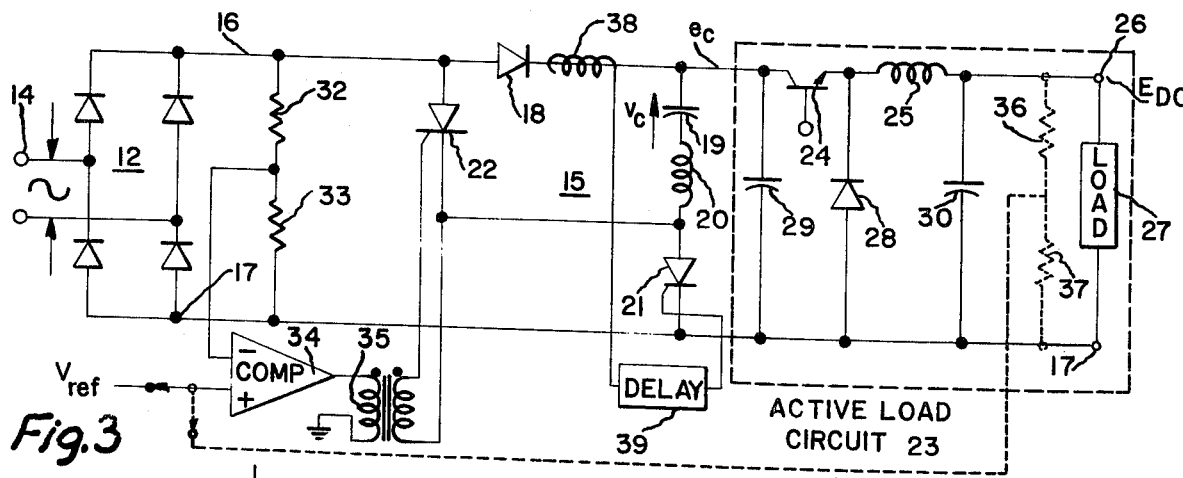
FIG. 3 is a schematic circuit diagram of a power circuit with an active or controlled dc load which includes a controlled capacitive input filter according to the teaching of the invention.

The power circuit with an active d-c load shown in FIG. 3 incorporates a full wave rectifier and controlled capacitive filter for making more efficient use of the filter capacitor by controlling the charge and discharge intervals of the capacitor using controlled solid state switches. In this embodiment, the filter capacitor during discharge is effectively placed in series with a predetermined rectifier terminal and the load and is discharged completely. Due to its more effective and efficient utilization, the filter capacitor in FIG. 3 is smaller than in FIG. 1. In the single phase power circuit, a 60 Hz or other low power frequency source of a-c line voltage is connectable to the input terminals 14 and is applied directly to the input of full wave diode bridge rectifier 12. The controlled capacitive filter circuit indicated generally at 15 is connected directly between rectifier output terminals 16 and 17 and preferably uses gate controlled thyristors as the controlled switches. Silicon controlled rectifiers (SCR's) are preferred for this application although the gate turn-off thyristor (GTO) may also be used. Controlled filter 15 is comprised by a circuit connected between rectifier output terminals 16 and 17 which includes a blocking diode 18 having its anode coupled to positive terminal 16 so as to normally conduct load current, and the series arrangement of a filter capacitor 19, a small di/dt inductor 20, and a first thyristor 21 connected between the cathode of diode 18 and negative terminal 17. In this arrangement thyristor 21 controls the charge intervals of filter capacitor 19, while a second thyristor 22 connected between positive terminal 16 and the junction between inductor 20 and thyristor 21 controls the discharge intervals in successive half cycles of the line voltage.

The active load circuit 23 is, for example, a transistor chopper of a type well known in the art. Briefly, chopper 23 includes a power transistor 24 and coasting inductor 25 in series between blocking diode 18 and positive d-c output terminal 26, a load 27 provided between output terminals 26 and 17, and a coasting diode 28 provided between negative output terminal 17 and the intersection of power transistor 24 and coasting inductor 25. By operating power transistor 24 at a high frequency chopping rate, the spiked voltage $e_c$ supplying the active load is regulated to produce a substantially constant d-c output voltage $E_{DC}$ applied to the load. During the conducting intervals of power transistor 24, the load is energized directly by the controlled capacitive filter voltage, while during the non-conducting intervals, coasting diode 28 provides a path for circulating energy discharged by coasting inductor 25. High frequency input capacitor 29 and high frequency load voltage filter capacitor 30 are desirable for some applications and may be omitted for some applications. Various active load circuits may be used with the controlled input filter 15, and in general include at least one active device for producing a regulated or predetermined dc output voltage or current. Within the broader scope of the invention, the rectifier and controlled capacitive filter can be used directly with some loads suitable for energization by the highly spiked voltage $e_c$ at the filter output.

Figure 4:
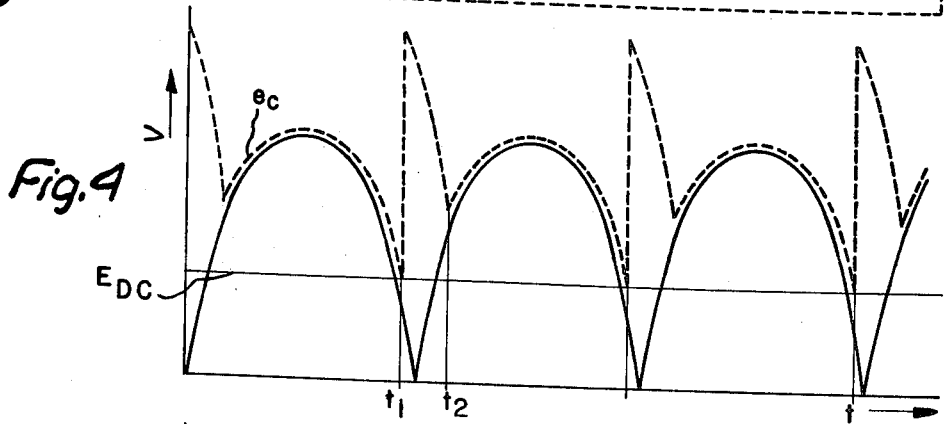
FIGS. 4 and 5 are waveform diagrams illustrating respectively the usual and resonant charging modes of operation of the controlled capacitive filter.

The waveforms of FIG. 4 illustrate the operation of controlled filter 15. During the peaks of the full wave rectified sinusoidal line voltage, shown in full lines, thyristor 21 is conducting and filter capacitor 19 is charging through diode 18. Small inductor 20 limits the rate of rise of current through thyristor 21 at turn-on to a safe value and also prevents the d-c voltage feeding active load 23 from collapsing when thyristor 21 is initially fired. During this time, energy is supplied to the active load directly from the line since the rectified voltage is higher than the desired d-c voltage $E_{DC}$. Capacitor 19 charges to the peak of the rectified sinusoidal voltage at which time thyristor 21 is naturally commutated off as capacitor 19 attempts to reverse its current and supply energy to the load. As long as the rectified line voltage exceeds $E_{DC}$, the filter capacitor energy is stored for later use rather than discharging when it is not needed. Since the required filter capacitor is smaller in FIG. 1, the capacitor voltage substantially follows the rectified sinusoidal voltage during the charging interval. At time $t_1$, the rectified ac line voltage falls to an insufficient level, i.e., less than $E_{DC}$. At that point or slightly earlier, the second thyristor 22 is fired and filter capacitor 19 is effectively inserted in series with the load since reverse voltage is now applied to diode 18. Thus, at time $t_1$ the voltage $e_c$ feeding the active load increases rapidly to a high level equal to the peak of the rectified ac line voltage (i.e., the capacitor voltage) plus the value of the sinusoidal ac line voltage at $t_1$. Small inductor 20 also limits the rate of rise of current through thyristor 22 and prevents a high current surge into chopper input capacitor 29, which supplies high frequency current demanded by the chopper. After the initial rapid rise in capacitor voltage, capacitor 19 discharges and supplies energy to the load until it is completely discharged at $t_2$. At time $t_2$, diode 18 is again forward biased and conducts, as a result of which thyristor 22 is naturally commutated off. After a small delay to insure that thyristors 21 and 22 do not have overlapping conduction intervals, thyristor 21 is once again fired to recharge capacitor 19. Small inductor 20 limits the rate of rise of current through thyristor 21 as well as prevents the d-c voltage feeding the active load from collapsing when thyristor 21 is fired. Filter capacitor 19 now recharges to the peak of the rectified sinusoidal line voltage and the cycle repeats.

Suitable gating circuits for SCR type thyristors 21 and 22 to provide appropriately timed gating pulses in accordance with the mode of operation just described are shown in FIG. 3. To render thyristor 22 conductive at time $t_1$ in each half cycle, the instantaneous full wave rectified sinusoidal voltage between rectifier output terminals 16 and 17 is sensed, and the sensor signal is compared either with a reference voltage representing the desired output voltage $E_{DC}$ or with a voltage sensor signal representing the actual instantaneous value of $E_{DC}$. To this end, a suitable voltage sensor is used such as a voltage divider comprising resistors 32 and 33 connected in series between rectifier output terminals 16 and 17, and the signal level voltage at the junction is supplied to the inverting input of a comparator 34. Preferably, a reference voltage $V_{ref}$ is supplied to the non-inverting input, thereby producing an output when the full wave rectified sinusoidal line voltage begins to fall below $V_{ref}$, and the comparator output is fed to a pulse transformer 35 to generate the gating pulse supplied to the gate of thyristor 22. Instead of using the reference $V_{ref}$, the actual dc output voltage $E_{DC}$ can be sensed as by using another voltage divider comprising resistors 36 and 37 connected in series between output terminals 26 and 17 (shown in dashed lines), the sensor signal at the junction being fed to the comparator non-inverting input. To assure that thyristors 21 and 22 are not conductive simultaneously, the gating pulse for thyristor 21 is delayed slightly beyond the time $t_2$ in FIG. 4. As the capacitor voltage discharges to zero, blocking diode 18 is again forward biased and begins to conduct load current. This resumption of load current is sensed by a current transformer 38 or other suitable current sensor, and the sensor signal is fed to a delay circuit 39 such as a one-shot multivibrator to generate the delayed gating signal which is supplied to the gate of thyristor 21. If desired, the capacitor voltage can be sensed directly.

For many applications the size of filter capacitor 19 can be reduced still further than has been described since the active load 23 may be operated at reduced current during the discharge time of the filter capacitor (the interval between $t_1$ and $t_2$). For example, for lamp loads such as a Lucalox (trademark of General Electric Company) lamp, reduced current just enough to keep the lamp from deionizing may be supplied during the valleys of the rectified a-c line voltage. Lamp current waveforms and further information on this application are given in allowed application, Ser. No. 430,088, filed Jan. 2, 1974 by the inventor with Steven C. Peak and John N. Park, now U.S. Pat. No. 3,890,537 entitled "Solid State Chopper Ballast for Gaseous Discharge Lamps," assigned to the same assignee as this invention. As therein described, the shape of the lamp current may be controlled so that the current drawn from the line results in a high input power factor. Also see allowed application Ser. No. 429,914, filed Jan. 2, 1974 by the inventor and John N. Park, now U.S. Pat. No. 3,913,002 entitled "Power Circuits for Obtaining a High Power Factor Electronically," assigned to the same assignee. FIG. 3 may be used as a lamp ballast as well as FIG. 6.

Figure 5:
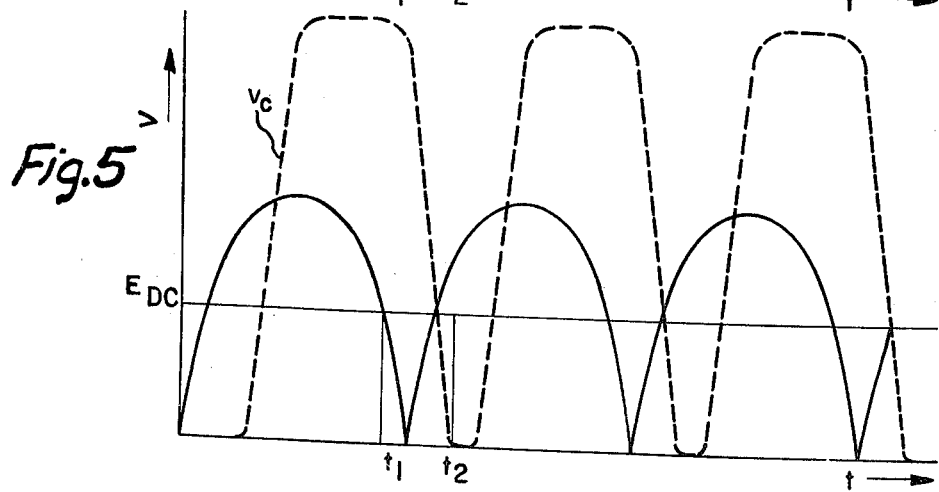

Controlled input filter 15 in FIG. 3 can also be operated in resonant charging mode when the modification is made that di/dt limiting inductor 20 is replaced by a somewhat larger inductor. By increasing the amount of delay provided by delay circuit 39 and thus delaying the firing of thyristor 21 until near the peak of the rectified sinusoidal wave, filter capacitor 19 charges resonantly to approximately twice the peak a-c line voltage. Thus, much more energy is stored in a given size of filter capacitor and the value of capacitance needed for a given application is reduced. FIG. 5 shows such operation. At time $t_1$ when the rectified sinusoidal voltage falls below $E_{DC}$, thyristor 22 is gated into conduction as before and filter capacitor 19 discharges completely. Between time $t_2$ and the delayed time at which thyristor 21 is again fired, the capacitor voltage $V_c$ is zero. Thyristor 21 is naturally commutated off just after capacitor voltage $V_c$ reaches its peak value in each half cycle.

Controlled capacitive input filter 15' in FIG. 6 is a modification of the controlled filter in FIG. 3 using a pair of thyristors 22a and 22b respectively connected to the input terminals of diode bridge rectifier 12 to control the discharge of filter capacitor 19 alternately according to the polarity of the a-c line voltage. Thus, blocking diode 18 is eliminated along with the semiconductor voltage drop in series with the load. The circuit operates the same as the circuit in FIG. 3 except that filter capacitor 19 is discharged through thyristor 22a or thyristor 22b directly, depending on the line polarity, rather than through one of the top diodes in the bridge rectifier. The same sensing and gating circuits are used as in FIG. 3 with the exception that the output of the pulse transformer is connected to both gates with separate secondary windings, since one thyristor is reverse biased and will not conduct. Active load 23' in FIG. 6 includes an a-c load such as a gaseous discharge lamp. Active load 23' is similar to the active load of FIG. 3 with the exception of the addition of a small input filter inductor 41, and the substitution between d-c output terminals 26 and 17 of a transistor bridge 42 operated as is well known in the art to supply the a-c load 43.

FIG. 7 shows a modification of the controlled capacitive input filter in FIG. 6 wherein an SCR or other thyristor is eliminated at the expense of another diode. In this arrangement, controlled filter 15" includes a pair of diodes 44a and 44b respectively connected between the input terminals of diode bridge rectifier 12 and the anode of thyristor 22c. In operation as is evident, gating pulses are supplied to thyristor 22c at $t_1$ in each half cycle to control the discharge interval of filter capacitor 19. Both FIG. 6 and FIG. 7 may also be operated in the resonant charging mode of the controlled filter as previously described with regard to FIG. 5.

FIG. 8 shows still another modification of the controlled capacitive input filter circuit using two of the controlled filters 15 of FIG. 3 connected in tandem. In each controlled filter identical components are designated by the same numerals. The same sensing and gating circuits (not here shown) are used as in FIG. 3. In the tandem connection of the controlled filter, capacitors 19 are charged in parallel and placed in series for the discharge. Accordingly, this arrangement can be used to generate high voltage pulses.

FIG. 9 shows a somewhat simpler configuration of the controlled filter using a single diode 45 and inverse-parallel SCR or other thyristor 46 connected in series with filter capacitor 19 between rectifier output terminals 16 and 17. The same voltage sensing and gating circuit as was used in FIG. 3 for thyristor 22 is used to supply gating pulses to thyristor 46, which in this simpler configuration controls the discharge intervals of capacitor 19. The operation is explained with regard to the waveforms in FIG. 10. Capacitor 19 charges through diode 45 to the peak value of the full wave rectified sinusoidal line voltage, and discharges through thyristor 46 during the valleys. A somewhat larger filter capacitor is needed as compared to the previous embodiments since the line is not supplying energy during discharge of the capacitor and since the capacitor does not completely discharge all of its stored energy during each cycle. Thus, the capacitor voltage $v_c$ remains at its peak value until time $t_1$ at which the decreasing rectified sinusoidal voltage begins to fall below the desired d-c output voltage $E_{DC}$. At this time a gating pulse is derived by comparator 34 and pulse transformer 35 and fed to the gate of thyristor 46. Capacitor 19 then discharges through thyristor 46 until time $t_2$ in the next half cycle when the rising rectified sinusoidal voltage exceeds the capacitor voltage $v_c$ and energy is supplied directly from the line to the load as the capacitor is once again charged from the a-c line. During discharge of the filter capacitor, it is observed, the filter capacitor remains in parallel with the load rather than being effectively placed in series with the load as in the other embodiments of the controlled filter.

In the simpler controlled filter in FIG. 9, better use is made of the filter capacitor than in a conventional capacitive filter such as that shown in FIG. 1, and the additional capacitance needed for a given application as compared to the previously described controlled filters is often offset by its relative simplicity. Because of its low cost and minimum number of components, the controlled filter of FIG. 9 is especially suitable for an electronic ballast for gaseous discharge lamps. Active load 23' in an exemplary electronic ballast can be identical to the active load in FIG. 6 assuming that the a-c load is a Lucalox lamp or other lamp. In this embodiment as well as all of the previous embodiments, the thyristor or thyristors controlling the discharge intervals of the filter capacitor, as well as those controlling the charging intervals in the previous embodiments, have relatively low current ratings as compared to the load since they conduct for only a relatively short time each cycle. Inexpensive phase control type SCR's are therefore suitable for use in controlled filters.

In summary, the single phase, d-c controlled capacitive filter is most commonly used in conjunction with a diode bridge or other full wave rectifier and an active load circuit having a predetermined unidirectional output voltage. As more broadly defined, the controlled filter connected between selected rectifier terminals includes the filter capacitor and a solid state device such as a thyristor or diode connected in series in a circuit coupled between the rectifier output terminals, the solid state device and sensing and gating circuit where applicable comprising means for controlling the charging of the filter capacitor. The controlled filter further includes means for controlling discharge of the filter capacitor comprised by at least one controlled solid state switch such as a thyristor, and sensing and gating circuit means for rendering the controlled switch conductive during intervals when the instantaneous rectified line voltage is below the predetermined output voltage. For some applications the reduction in capacitance made possible by more efficient capacitor use eliminates the need for electrolytic type capacitors with their long life reliability and limited temperature range problems.

While the invention has been particularly shown and described with reference to several preferred embodiments thereof, it will be understood that the foregoing and other changes in form and details may be made therein without departing from the spirit and scope of the invention.

The invention claimed is:

1. A power circuit with a controlled capacitive filter comprising
   a single phase full wave rectifier having a pair of input terminals connectable to a source of low frequency alternating-current line voltage and positive and negative output terminals at which full wave rectified line voltage is produced,
   a controlled capacitive filter connected between selected rectifier terminals and including a filter capacitor and a first gate controlled thyristor for controlling charging of said filter capacitor which are connected in series in a circuit coupled between said rectifier output terminals, and further including means comprised by at least a second gate controlled thyristor for controlling discharge of said filter capacitor,
   an active load circuit supplied with voltage by said controlled filter and producing a regulated unidirectional output voltage,
   first sensing and gating means for rendering conductive said first gate controlled thyristor at a preselected delay after said filter capacitor has completely discharged, and
   second sensing and gating means for rendering conductive said second gate controlled thyristor for conduction during the intervals when the instantaneous full wave rectified line voltage is below the regulated unidirectional output voltage.

2. A power circuit according to claim 1 wherein the circuit coupled between said rectifier output terminals further includes a diode connected between said positive rectifier output terminal and filter capacitor,
   said second gate controlled thyristor being connected between said positive rectifier output terminal and a junction between said filter capacitor and first gate controlled thyristor.

3. A power circuit according to claim 1 wherein the circuit coupled between said rectifier output terminals further includes an inductor in series between said filter capacitor and first gate controlled thyristor, and
   said sensing and gating means for rendering conductive said first gate controlled thyristor effects resonant charging of said filter capacitor by delaying gating until near the peak rectified line voltage.

4. A power circuit according to claim 1 wherein said second gate controlled thyristor is connected between one rectifier input terminal and a junction between said filter capacitor and first gate controlled thyristor, and said means for controlling discharge of said filter capacitor further includes a third gate controlled thyristor connected between the other rectifier input terminal and the junction between said filter capacitor and first gate controlled thyristor, said second sensing and gating means rendering conductive said second and third gate controlled thyristors depending on the line voltage polarity.

5. A power circuit according to claim 1 wherein said means for controlling discharge of said filter capacitor further includes a pair of diodes respectively connected in series with said second gate controlled thyristor between said rectifier input terminals and a junction between said filter capacitor and first gate controlled thyristor.

6. A power circuit according to claim 1 wherein said first sensing and gating means includes current sensor means and a delay circuit actuated by resumption of current flow after said filter capacitor has completely discharged for generating a gating pulse supplied to said first gate controlled thyristor, and said second sensing and gating means includes first voltage sensor means for sensing the instantaneous full wave rectified line voltage and generating a first sensor signal indicative thereof, second voltage sensor means for sensing the instantaneous unidirectional output voltage and generating a second sensor signal indicative thereof, and means for comparing said sensor signals and generating a gating pulse supplied to said second gate controlled thyristor.

7. A power circuit with a controlled capacitive filter for use with an active load circuit having a predetermined unidirectional output voltage comprising a single phase full wave rectifier having a pair of input terminals connectable to a source of low frequency alternating-current line voltage and producing full wave rectified line voltage at a pair of output terminals, a controlled capacitive filter connected between selected rectifier terminals and including a filter capacitor and first gate controlled thyristor for controlling charging of said filter capacitor which are connected in series in a circuit coupled between said rectifier output terminals, said controlled filter further including means comprised by at least a second gate controlled thyristor for controlling discharge of said filter capacitor and operative to connect said filter capacitor in series between a predetermined positive rectifier terminal and the active load circuit in each half cycle of the line voltage, means for rendering conductive said first gate controlled thyristor at a preselected delay after said filter capacitor has completely discharged, and means for rendering conductive said second gate controlled thyristor for conduction during the intervals when the instantaneous full wave rectified line voltage is below the predetermined unidirectional output voltage.

8. A power circuit according to claim 7 wherein said predetermined rectifier terminal is the positive rectifier output terminal, the circuit coupled between said rectifier output terminals further includes a diode connected between said positive rectifier output terminal and filter capacitor, and said second gate controlled thyristor is connected between said positive rectifier output terminal and a junction between said filter capacitor and first gate controlled thyristor.

9. A power circuit according to claim 7 wherein the circuit coupled between said rectifier output terminals further includes an inductor in series between said filter capacitor and first gate controlled thyristor, and said means for rendering conductive said first gate controlled thyristor effects resonant charging of said filter capacitor by delaying gating until near the peak rectified line voltage.

10. A power circuit according to claim 7 wherein said second gate controlled thyristor is connected between one rectifier input terminal and a junction between said filter capacitor and first gate controlled thyristor, and said means for controlling discharge of said filter capacitor further includes a third gate controlled thyristor connected between the other rectifier input terminal and the junction between said filter capacitor and first gate controlled thyristor.

11. A power circuit according to claim 7 wherein said means for controlling discharge of said filter capacitor further includes a pair of diodes respectively connected to said pair of rectifier input terminals, said second gate controlled thyristor being connected to each of said diodes and to a junction between said filter capacitor and first gate controlled thyristor.

12. A power circuit according to claim 7 wherein said means for rendering conductive said second gate controlled thyristor includes voltage sensor means for sensing the instantaneous full wave rectified line voltage and generating a sensor signal indicative thereof, and means for comparing said sensor signal to a reference voltage representative of the predetermined unidirectional output voltage and generating a gating pulse supplied to said second gate controlled thyristor, and said means for rendering conductive said first gate controlled thyristor includes current sensor means and a delay circuit actuated by the resumption of current flow after said filter capacitor has completely discharged.

* * * * *